(12) United States Patent
Haber et al.

(10) Patent No.: US 9,435,043 B2
(45) Date of Patent: Sep. 6, 2016

(54) OXYGEN EVOLUTION REACTION CATALYSIS

(71) Applicants: The California Institute of Technology, Pasadena, CA (US); The Regents of the University of California, Oakland, CA (US)

(72) Inventors: Joel A. Haber, Pasadena, CA (US); Jian Jin, Berkeley, CA (US); Chengxiang Xiang, Costa Mesa, CA (US); John M. Gregoire, Sierra Madre, CA (US); Ryan J. Jones, Pasadena, CA (US); Dan W. Guevarra, Norwalk, CA (US); Aniketa A. Shinde, Upland, CA (US)

(73) Assignees: California Institute of Technology, Pasadena, CA (US); The Regents of the University of California, Oakland, CA (US)

( * ) Notice: Subject to any disclaimer, the term of this patent is extended or adjusted under 35 U.S.C. 154(b) by 10 days.

(21) Appl. No.: 14/569,497

(22) Filed: Dec. 12, 2014

(65) Prior Publication Data

US 2015/0292095 A1    Oct. 15, 2015

Related U.S. Application Data

(60) Provisional application No. 62/021,343, filed on Jul. 7, 2014, provisional application No. 62/021,325, filed on Jul. 7, 2014, provisional application No. 61/979,333, filed on Apr. 14, 2014, provisional application No. 61/979,359, filed on Apr. 14, 2014.

(51) Int. Cl.
*B01J 23/00* (2006.01)
*B01J 23/10* (2006.01)
*B01J 23/32* (2006.01)
*B01J 23/40* (2006.01)
*B01J 23/42* (2006.01)
*C25B 11/04* (2006.01)
*C25B 1/02* (2006.01)
(Continued)

(52) U.S. Cl.
CPC ............. *C25B 11/0452* (2013.01); *C25B 1/02* (2013.01); *C25C 7/02* (2013.01); *H01M 4/9016* (2013.01)

(58) Field of Classification Search
CPC .......... B01J 21/00; B01J 23/10; B01J 23/16; B01J 23/83; B01J 23/84; B01J 23/8476; B01J 23/8892
USPC ........ 502/302–304, 324, 326, 349, 352, 353
See application file for complete search history.

(56) References Cited

U.S. PATENT DOCUMENTS 4,311,611 A * 1/1982 Sasaki ...................... B01J 23/94
                                                   502/22
5,380,692 A * 1/1995 Nakatsuji ........... B01D 53/9418
                                                  502/241
5,789,339 A * 8/1998 Ziebarth ............ B01D 53/8668
                                                  502/303

(Continued)

*Primary Examiner* — Cam N. Nguyen
(74) *Attorney, Agent, or Firm* — Joseph R. Baker, Jr.; Gavrilovich, Dodd & Lindsey LLP (57) ABSTRACT

An Oxygen Evolution Reaction (OER) catalyst includes a metal oxide that includes oxygen, cerium, and one or more second metals. In some instances, the cerium is 10 to 80 molar % of the metals in the metal oxide and/or the catalyst includes two or more second metals. The OER catalyst can be included in or on an electrode. The electrode can be arranged in an oxygen evolution system such that the Oxygen Evolution Reaction occurs at the electrode.

19 Claims, 3 Drawing Sheets (51) Int. Cl.
*C25C 7/02* (2006.01)
*H01M 4/90* (2006.01)

(56) References Cited

U.S. PATENT DOCUMENTS

| | | | | |
|---|---|---|---|---|
| 6,881,384 B1 * | 4/2005 | Uenishi | ................ | B01D 53/945 422/177 |
| 7,015,173 B2 * | 3/2006 | Bogan, Jr. | .............. | B01J 23/002 502/208 |
| 7,304,013 B2 * | 12/2007 | Addiego | ................ | B01J 23/745 502/158 |
| 7,361,622 B2 * | 4/2008 | Benderly | ............ | B01J 35/0006 502/129 |
| 7,432,222 B2 * | 10/2008 | Choudhary | .............. | B01J 23/83 252/373 |
| 7,713,908 B2 * | 5/2010 | Yamamoto | ............. | B01J 23/002 502/104 |
| 8,153,546 B2 * | 4/2012 | Brazdil | .................. | B01J 37/031 502/243 |
| 8,435,920 B2 * | 5/2013 | White | .................... | B01J 23/002 252/373 |
| 8,455,388 B2 * | 6/2013 | Brazdil | .................. | B01J 23/002 502/205 |
| 8,999,878 B2 * | 4/2015 | Takeshima | ........... | B01D 53/945 502/100 |

* cited by examiner

OXYGEN EVOLUTION REACTION CATALYSIS

CROSS REFERENCE TO RELATED APPLICATIONS

This Application claims the benefit of U.S. Provisional Patent Application Ser. No. 62/021,343, filed on Jul. 7, 2014; and also claims the benefit of U.S. Provisional Patent Application Ser. No. 62/021,325, filed on Jul. 7, 2014; and also claims the benefit of U.S. Provisional Patent Application Ser. No. 61/979,359, filed on Apr. 14, 2014; and also claims the benefit of U.S. Provisional Patent Application Ser. No. 61/979,333, filed on Apr. 14, 2014; each of which is incorporated herein in its entirety.

STATEMENT REGARDING FEDERALLY SPONSORED RESEARCH

This invention was made with government support under grant no. DE-SC0004993 awarded by the US Department of Energy. The government has certain rights in the invention.

FIELD OF THE INVENTION

The invention relates to catalysts, and more particularly, to electrocatalysts.

BACKGROUND

A variety of different applications make use of the Oxygen Evolution Reaction (OER). Examples of these applications include solar fuels generation and electrowinning. In applications such as solar fuels generation, the overpotential that can be applied to the electrodes where the oxygen evolution reaction occurs is often limited to the photovoltage that can be achieved as a result of light being incident on semiconductors. Because of this limited overpotential, it is desirable to have a catalyst that is effective at low overpotentials. However, current electrocatalysts often do not provide the desired level of efficiency for low overpotential applications. Further, current catalysts often do not tolerate the acidic conditions that are present in applications such as electrowinning. Additionally, these catalysts often make use of expensive components such as iridium and ruthenium. Accordingly, there is a need for improved Oxygen Evolution Reaction (OER) catalysts.

SUMMARY

The disclosure provides an Oxygen Evolution Reaction (OER) catalyst that comprises a metal oxide that includes oxygen, cerium, and one or more second metals. The cerium is 10 to 80 molar % of the metals in the metal oxide. In one embodiment, the one or more second metals are selected from the group consisting of transition metals, post transition metals and lanthanides. In another embodiment, the one or more second metals are transition metals. In yet another embodiment, the metal oxide is represented by $(M_{1v}M_{2w}M_{3y}Ce_z)O_x$ where $M_1$ represents a first metal, $M_2$ represents a second metal, $M_3$ represents a third metal, $v+w+y+z=1$, v is greater than or equal to 0 and less than 1, w is greater than or equal to 0 and less than 1, y is greater than 0 and less than 1, and z is greater than 0, and x is greater than 0. In a further embodiment, z is greater than or equal to 0.1 and less than or equal to 0.8. In another embodiment, z is greater than or equal to 0.3 and less than or equal to 0.6. In still another embodiment, $M_3$ is selected from the group consisting of cobalt, nickel and iron, $M_1$ and $M_2$ are different, $M_1$ and $M_2$ are selected from the group consisting of transition metals, post transition metals and lanthanides, and v is greater than 0 and w is greater than 0. In a further embodiment, $M_1$ and $M_2$ are different from $M_3$, $M_1$ and $M_2$ are selected from the group consisting of Ni, Mn, Cu, Zn, Sn, Ta, Y, Gd, La, and Fe, and v is greater than 0 and w is greater than 0. In another embodiment, $M_1$, $M_2$, and $M_3$ are different, $M_2$ and $M_3$ are each selected from the group consisting of cobalt, nickel and iron, $M_1$ is selected from the group consisting of transition metals, post transition metals and lanthanides, and v is greater than 0 and w is greater than 0. In yet another embodiment, $M_1$, $M_2$, and $M_3$ are different, $M_2$ and $M_3$ are each selected from the group consisting of cobalt, nickel and iron, $M_1$ is selected from the group consisting of Ni, Mn, Cu, Zn, Sn, Ta, Y, Gd, La, and Fe, and v is greater than 0 and w is greater than 0. In a further embodiment, $M_1$ represent La. In another embodiment, the metal oxide is represented by $(Fe_vNi_wCo_yCe_z)O_x$ and v is greater than 0 and w is greater than 0. In one embodiment, the metal oxide has an opacity less than 50% per 100 nm thickness when averaged over the visible spectrum. In another embodiment, the metal oxide provides an Oxygen Evolution Reaction (OER) Tafel slope greater than 50 mV/decade. In yet another embodiment, the metal oxide is included in an electrode. In a further embodiment, the electrode is included in an oxygen evolution system where the Oxygen Evolution Reaction (OER) occurs at the electrode.

Another Oxygen Evolution Reaction (OER) catalyst includes a metal oxide that includes oxygen, cerium, and two or more second metals.

Still another Oxygen Evolution Reaction (OER) catalyst has a metal oxide that includes cerium and provides a Tafel slope for the Oxygen Evolution Reaction (OER) that is greater than 50 mV/decade, 65 mV/decade, or 85 mV/decade.

Yet another Oxygen Evolution Reaction (OER) catalyst has a metal oxide that includes cerium and has an opacity less than 50% averaged over the visible spectrum for a 100 nm thickness.

Another Oxygen Evolution Reaction (OER) catalyst has a metal oxide that includes three or more metals selected from the group consisting of Mn, Co, Ta, Sn, and Sb.

The above catalysts can be an electrocatalyst included in an electrode. The electrode can optionally be included in an oxygen evolution system such that the Oxygen Evolution Reaction occurs at the electrode during the operation of the system. In some instances, the system has the electrode positioned in an environment having a pH less than 3 during operation of the system.

DETAILED DESCRIPTION

As used herein and in the appended claims, the singular forms "a," "and," and "the" include plural referents unless the context clearly dictates otherwise. Thus, for example, reference to "a catalyst" includes a plurality of such catalysts and reference to "the composition" includes reference to one or more compositions and so forth.

Unless defined otherwise, all technical and scientific terms used herein have the same meaning as commonly understood to one of ordinary skill in the art. Although there may be many methods and reagents similar or equivalent to those described herein, the exemplary methods and materials are presented herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Any publications discussed above and throughout the text are provided solely for their disclosure prior to the filing date of the present application. Nothing herein is to be construed as an admission that the inventors are not entitled to antedate such disclosure by virtue of prior disclosure.

The disclosure describes a class of catalysts that are effective at low overpotentials. For instance, the inventors have found that the inclusion of lanthanides such as cerium in a metal oxide that includes multiple metals provides a surprisingly high Tafel slope for the Oxygen Evolution Reaction. For instance, the metal oxides can provide oxygen evolution Tafel slopes greater than 50 mV/decade, or even greater than 75 mV/decade. As an example, the metal oxide represented by $Ni_{0.27}Co_{0.27}Ce_{0.46}O_x$ acts as an electrocatalyst for the oxygen evolution reaction and has a Tafel slope of about 90 mV/decade. Higher Tafel slopes indicate that higher catalytic currents can be achieved at lower overpotentials. For instance, at an overpotential of around 350 mV and a planar $Ni_{0.27}Co_{0.27}Ce_{0.46}O_x$ surface, the $Ni_{0.27}Co_{0.27}Ce_{0.46}O_x$ provides a catalytic current of about 10 mA/cm². At an overpotential of around 250 mV, same material provides a catalytic current of about 0.15 m/A². The inventors believe that the catalytic current at the 250 mV overpotential is surprisingly more than ten times the catalytic current that is achieved with metal oxides that are within the same composition space but that exclude cerium. Additionally, the improvements in catalytic activity are associated with unexpectedly high cerium levels. For instance, the cerium can be in a range of 10-80 molar percent of the metals included in the metal oxide. A particularly elevated zone of catalytic activity appears to occur when the cerium is in a range of 30-60 molar percent of the metals included in the metal oxide. Without being bound to theory, the improvement in catalytic performance is believed to be a result of the cerium forming a different and/or separate phase of matter from the other metals during the operation of an electrode including the metal oxide.

The elevated Tafel slopes associated with these catalysts also indicates an increased level of sensitivity of the surface area of the catalyst. For instance, these Tafel slopes indicate that increasing the surface area of the catalyst can increase the catalytic current for a given overpotential. Techniques such as microstructuring can be used to increase the surface area of the catalyst without increasing the size of an electrode on which the catalyst is positioned. Accordingly, these techniques may be used to enhance the level of catalytic activity. As a result, the benefits of these catalysts may be achieved in applications with higher overpotentials.

When desired, the components of the above metal oxides can be selected so as to provide a transparent or substantially transparent catalyst. For instance, the components of the above metal oxides can be selected such that the opacity of the catalyst is less than 30%, 50%, or 70% averaged over the visible spectrum for a 100 nm thick film. As a particular example, the catalyst $(La_{0.1}Ni_{0.1}Co_{0.3}Ce_{0.5})O_x$ has an opacity of about 50% for the visible spectrum for a 100 nm thick film at an operational potential of 0.33 V vs $H_2O/O_2$ in 1.0 M NaOH. Catalysts that are transparent or substantially transparent to light are desirable for applications such as solar fuels generators where it is often desirable for light to pass through the catalyst before reaching one or more underlying layers of the device.

The catalyst can include, consist of, or consist essentially of a metal oxide that includes oxygen, cerium, and one or more second metals. In some instances, the metal oxide includes two, three, or more than three second metals. All or a portion of the one or more second metals can be selected from the group consisting of transition metals, post transition metals and lanthanides. Post transition metals are selected from the group consisting of Ga, In, Tl, Sn, Pb, and Bi. In some instances, all or a portion of the one or more second metals are transition metals. In some instances, the molar % of the metal in the above metal oxides that is cerium is greater than 10%, 30%, 40% and/or less than 60%, 70%, or 80%.

In one example, the metal oxide is represented by $(M_{1v}M_{2w}M_{3y}Ce_z)O_x$ where $M_1$ represents a first metal, $M_2$ represents a second metal, $M_3$ represents a third metal, v+w+y+z=1, v is greater than or equal to 0 and less than 1, w is greater than or equal to 0 and less than 1, y is greater than 0 and less than 1, and z is greater than 0 or greater than or equal to 0.1 or greater than or equal to 0.3 and/or less than 1 or less than or equal to 0.8 or less than or equal to 0.6, and x is greater than 0 or greater than or equal to 0.5 and/or less than or equal to 3, 2, or 1.6. In one example, $M_3$ represents cobalt, nickel or iron. In another example, $M_3$ represents cobalt, nickel or iron and $M_1$ and $M_2$ are selected from the group consisting of transition metals, post transition metals and lanthanides. In another example, $M_3$ represents cobalt, nickel or iron and $M_1$ and $M_2$ are selected from the group consisting of Ni, Mn, Cu, Zn, Sn, Ta, Y, Gd, La, and Fe.

In some instances $M_2$ and $M_3$ are each selected from the group consisting of cobalt, nickel and iron. In another example, $M_2$ and $M_3$ are each selected from the group consisting of cobalt, nickel and iron and $M_1$ is selected from the group consisting of transition metals, post transition metals and lanthanides. In another example, $M_2$ and $M_3$ are each selected from the group consisting of cobalt, nickel and $M_1$ is selected from the group consisting of Ni, Mn, Cu, Zn, Sn, Ta, Y, Gd, La, and Fe.

The metal oxide represented by $(Fe_vNi_wCo_yCe_z)O_x$ has been shown to be highly catalytic for the Oxygen Evolution Reaction, where v+w+y+z=1, v is greater than or equal to 0 and less than 1, w is greater than 0 and less than 1, y is greater than 0 and less than 1, and z is greater than 0 or greater than or equal to 0.1 or greater than or equal to 0.3 and/or less than 1 or less than or equal to 0.8 or less than or equal to 0.6, and x is greater than 0 or greater than or equal to 0.5 and/or less than or equal to 3, 2, or 1.6. Particular examples include $(Fe_{0.03}Ni_{0.3}Co_{0.2}Ce_{0.43})O_x)$ and $(Ni_{0.27}Co_{0.27}Ce_{0.46})O_x$.

The components of the above metal oxides can be selected so as to provide a transparent or substantially transparent catalyst. For instance, the components of the above metal oxides can be selected such that the opacity of the catalyst is less than 40%, 60%, or 90% per 100 nm thickness when averaged over the visible spectrum.

Of particular interest for increasing transparency are the above catalysts that include one or more group III elements (Sc, Y, La, and Ac) and/or one or more lanthanide group elements (La, Ce, Pr, Nd, Pm, Sm, Eu, Gd, Tb, Dy, Ho, Er, Tm, Yb, Lu). For instance, in the above metal oxides, $M_1$ can be selected from the group III elements or can be lanthanum. For instance, the metal oxide can be represented by $(La_v Ni_w Co_y Ce_z)O_x$ where $v+w+y+z=1$, v is greater than or equal to 0 and less than 1, w is greater than or equal to 0 and less than 1, y is greater than or equal to 0 and less than 1, and z is greater than or equal to 0 or greater than or equal to 0.1 or greater than or equal to 0.3 and/or less than 1 or less than or equal to 0.8 or less than or equal to 0.6, and x is greater than or equal to 0.5 and/or less than or equal to 3, 2, or 1.6, and at least one, two, three, or four of $v+w+y+z$ is greater than zero. As a particular example, the catalyst $(La_{0.1} Ni_{0.1} Co_{0.3} Ce_{0.5})O_x$ has an opacity of about 50% for the visible spectrum for a 100 nm thick film at an operational potential of 0.33 V vs $H_2O/O_2$ in 1.0 M NaOH. Catalysts that are transparent or substantially transparent to light are desirable for applications such as solar fuels generators where it is often desirable for light to pass through the catalyst to one or more underlying layers of the device.

Another class of metal oxides that are of interest include, consist of, or consist essentially of oxygen and one, two, three, four or five metals selected from the group consisting of Mn, Co, Ta, Sn, and Sb or the group consisting of Mn, Co, Ta, and Sb. In some instances, the metal oxide can be represented by $(Mn_v Co_w Ta_y Sb_z)O_x$ where $v+w+y+z=1$, v is greater than or equal to 0 and less than 1, w is greater than or equal to 0 and less than 1, y is greater than or equal to 0 and less than 1, and z is greater than or equal to 0 and less than 1, and at least one, two, three or four of the variables selected from the group consisting of v, w, y, and z are greater than zero. In some instances where the catalyst includes Ta and/or Sb, the catalysts have the Ta in an amount that is less than or equal to 15 molar % of the metals in the catalyst and/or the Sb in an amount that is less than or equal to 25 molar % of the metals in the catalyst. The metal oxides in this class having at least two, three or four of the variables selected from the group consisting of v, w, y, and z are greater than zero have been shown to have a desirable level of catalytic activity for the oxygen evolution reaction. Additionally, these catalysts are also tolerant of the highly acidic environment such as environments with a pH less than 3, 1, or 0. Catalysts for the oxygen evolution reaction are often placed in an environment with these pH levels for applications such as electrowinning and electrolytic hydrogen evolution. However, the catalysts that are used in highly acidic conditions typically include very expensive components such as iridium and ruthenium. Iridium oxide and ruthenium oxide are examples of catalysts that were previously used in these environments. By excluding these components, the price associated with these catalysts can be reduced. Accordingly, an oxygen evolution system can include one or more electrodes exposed to an environment with a pH less than 3, 1, or 0 where the electrode includes an oxygen evolution reaction catalyst that excludes iridium and ruthenium and/or excludes the noble metals (ruthenium, rhodium, palladium, silver, osmium, iridium, platinum, gold mercury, rhenium and copper). In some instances, the electrode exposed to the acidic environment is an anode.

The catalysts can catalyze a variety of reactions such as the Oxygen Evolution Reaction, the Oxygen Reduction Reaction, and redox reaction for flow batteries. In particular, the catalysts can catalyze the Oxygen Evolution Reaction (OER). The Oxygen Evolution Reaction is where oxygen gas is evolved from water or other oxides. One example of the oxygen evolution reaction is the oxidation of water by: $2H_2O \rightarrow O_2 + 4H^+ + 4e^-$. Another example of the oxygen evolution reaction is $4OH^- \rightarrow O_2 + 2H_2O + 4e^-$.

The catalyst can be an electrocatalyst. For instance, the catalyst can have one, two or three features selected from the group consisting of functioning at the surface of an electrode, defining the surface of the electrode, or interacting with one or more components of the environment in which the electrode is positioned. In some instances, the catalyst catalyzes oxygen evolution at the surface of an electrode and/or oxidizes water that is present in the environment in which the electrode is positioned.

Figure 1:
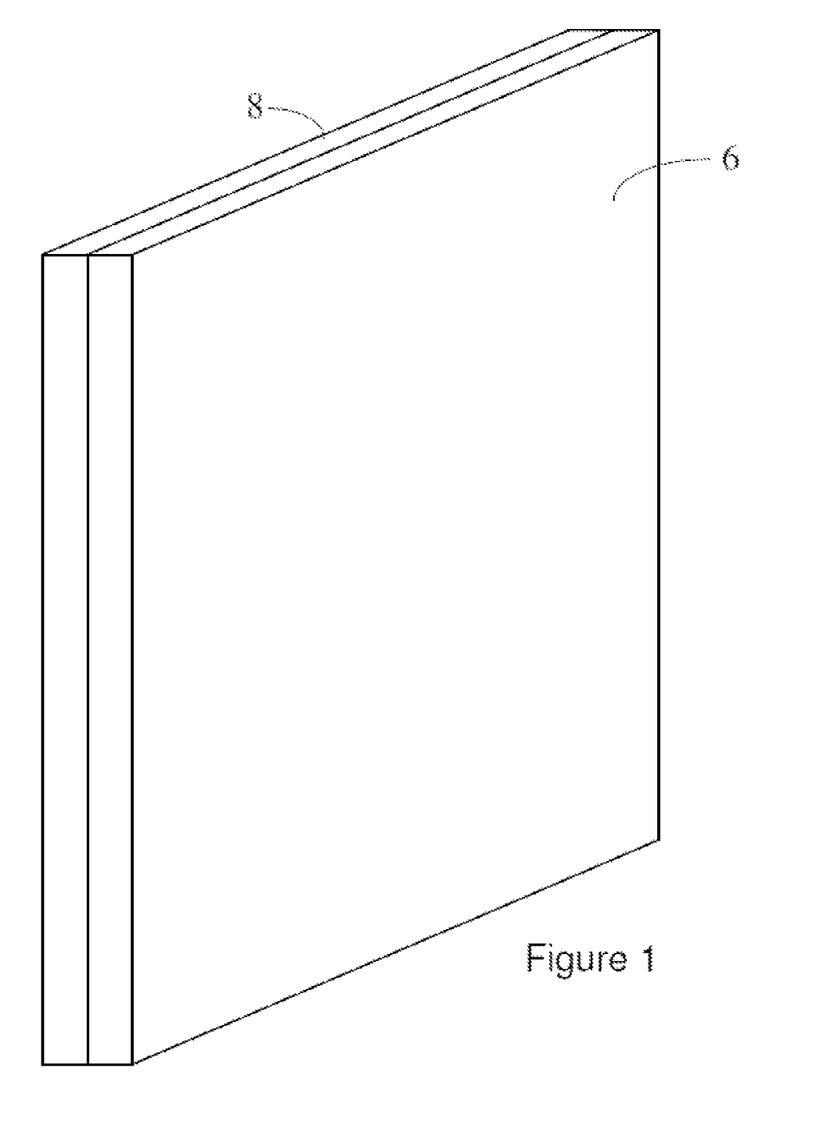
FIG. 1 is a perspective view of an electrode that can include an oxygen evolution catalyst.

FIG. 1 is a perspective view of an electrode that includes the catalyst. The electrode includes a catalytic layer 6 on an electrode base 8. The catalytic layer 6 includes, consists of, or consists essentially of one or more of the catalysts. The catalytic layer 6 can include components in addition to the one or more catalysts. For instance, the catalytic layer 6 can include one or more components selected from the group consisting of binders, polymers, membranes, electrical conductors, ionic conductors, solid electrolytes, porous materials, and inert support materials. The electrode base 8 represents the portion of the electrode having a traditional electrode construction. Alternately, the electrode base 8 represents the portion of the electrode having a traditional electrode construction but with a prior catalytic layer removed from the electrode. Accordingly, the catalytic layer 6 can be added to a prior art electrode or can replace a catalytic layer 6 on a prior art electrode.

The electrode base 8 can be a current collector such as a metal foil or sheet, mesh, or conducting fabric. As will become evident from the below illustration of a solar fuels generator, the electrode base 8 can be or include a semiconductor layer. Although the electrode base 8 is shown as a single layer of material, the electrode base 8 can include multiple layers of material. For instance, the electrode base 8 can include one or more layers of active material on a current collector. In instance where the electrode is employed to oxidize water, the electrode operates as an anode. During fabrication of the electrode, in some instances, the electrode base serves as the support for the catalyst. Accordingly, the catalyst can be formed directly on the electrode base.

Although the catalytic layer 6 is illustrated as being located on one side of the electrode base 8, the catalytic layer 6 can be located on both sides of the electrode base. Additionally or alternately, FIG. 1 illustrates the catalytic layer 6 being located on the electrode base 8; however, the electrode base 8 can be embedded in the catalytic layer 6. For instance, electrode base 8 can be a mesh that is embedded in the catalytic layer 6. Although FIG. 1 illustrates the catalytic layer 6 as a continuous layer of material, the catalytic layer 6 can be patterned so there are openings through the catalytic layer 6 and/or so there are regions of the catalytic layer 6 that are not continuous with one another such as would occurs when the catalytic layer 6 is arranged in islands on the electrode base.

In the illustration of FIG. 1, the face of the catalytic layer is illustrated as being substantially planar. However, the surface area of the catalyst layer can be increased beyond what can be achieved with the planar face. The high Tafel slopes associated with these catalysts indicate that increasing the surface area of the catalyst can increase the catalytic current for a given overpotential. A variety of methods can be employed to increase the surface area of the catalyst. For instance, the catalytic layer can be porous and/or can be microstructured using techniques such as mesoscale self assembly, soft lithograph, lithography, anodic etching, or other methods known to the art. In some instances, the catalytic layer is constructed such that the specific surface area of the catalytic layer is much greater than the geometric area of the electrode. This can be expressed as a surface roughness factor (specific surface area/geometric area of the surface area of a planar electrode covered by the catalytic layer). A non-porous catalyst layer with a smooth surface would have a surface roughness factor of 1. The catalytic layer may have surface roughness factors greater than 1, 10, 100 or 1000.

Figure 2:
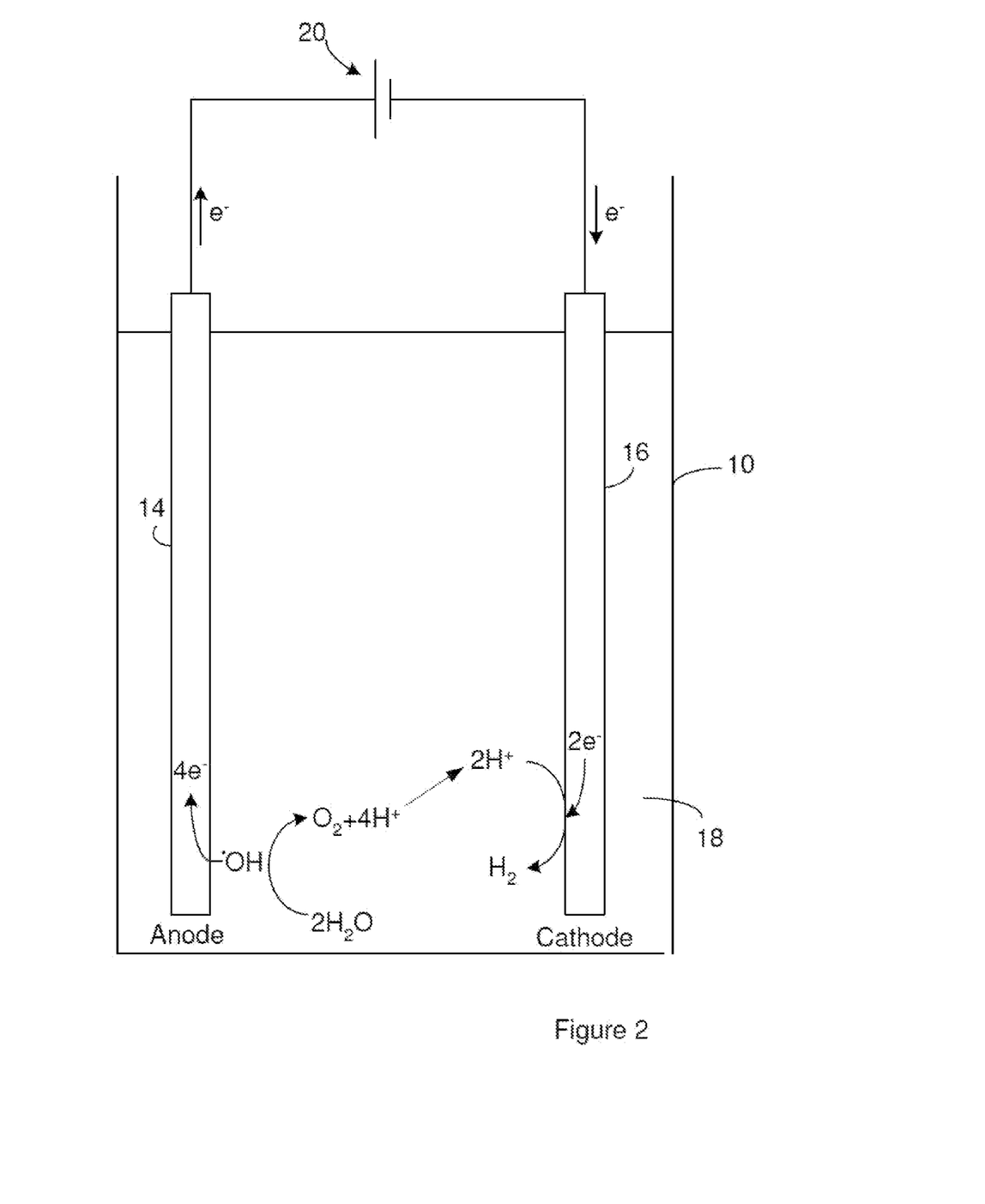
FIG. 2 illustrates an oxygen evolution system for water electrolysis.

The electrode can be employed in an oxygen evolution system where the Oxygen Evolution Reaction is catalyzed at one or more electrodes included in the system. Examples of these systems include, but are not limited to, water electrolysis systems, solar fuels generators, electrowinning systems, electrolytic hydrogen generators, reversible fuel cells, and reversible air batteries. FIG. 2 provides an example of a water electrolysis system. The system includes a vessel 10 having a reservoir. Anodes 14 and cathodes 16 are positioned in the reservoir such that anodes 14 and cathodes 16 alternate with one another. The anodes 14 and cathodes 16 are parallel or substantially parallel with one another. A medium 18 is positioned in the reservoir such that anodes 14 and the cathodes 16 are in contact with the medium 18. The anode can be constructed according to FIG. 1. For instance, the catalytic layer 6 can include or consist of a catalyst such as $(Ni_{0.27}Co_{0.27}Ce_{0.46})O_x$ and the electrode base 8 can be an fluorine doped tin oxide film on glass, a suitable light absorbing semiconductor, or a titanium foil current collector. The anode can include a layer of semiconductor or metal oxide on an FTO/glass or suitable foil current collector. The cathode and anode are connected to a voltage source 20 that is sufficient to apply the overpotential needed to cause the water electrolysis illustrated in FIG. 2. The voltage source can be any voltage source such as a photovoltaic voltage source, battery or other electronics.

Figure 3A:
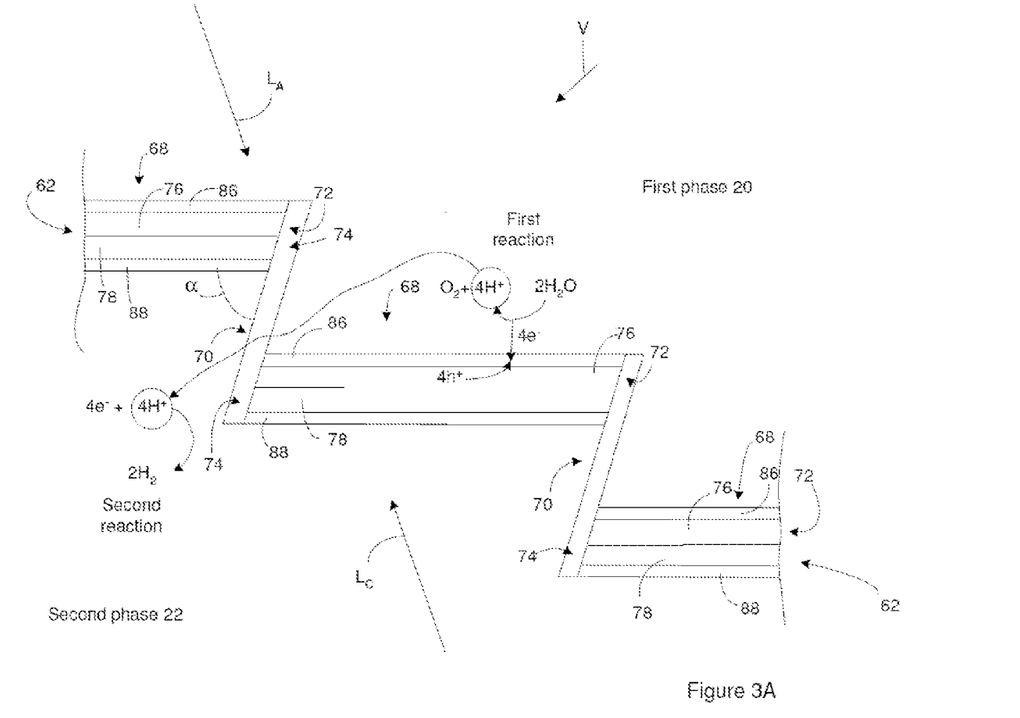
FIG. 3A is a cross section of a solar fuels generator.
Figure 3B:
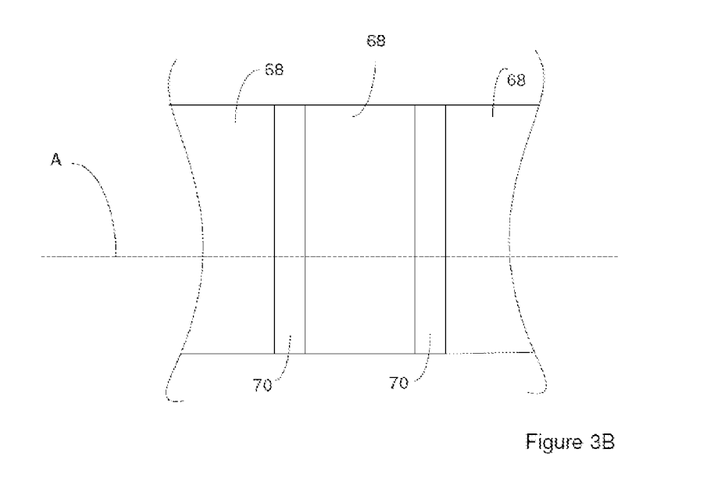
FIG. 3B is a sideview of the solar fuels generator shown in FIG. 3A taken looking in the direction of the arrow labeled V in FIG. 3A. The cross section shown in FIG. 3A can be taken along the line labeled A in FIG. 1B.

FIG. 3A is a cross section of a solar fuels generator. FIG. 3B is a sideview of the solar fuels generator shown in FIG. 3A taken looking in the direction of the arrow labeled V in FIG. 3A. The cross section shown in FIG. 3A can be taken along the line labeled A in FIG. 1B.

As shows in FIG. 3A, the solar fuels generator includes a barrier 62 between a first phase 64 and a second phase 66. The barrier 62 includes or consists of one or more reaction components 68 and one or more separator components 70. FIG. 3A illustrates the reaction components 68 linked with separator components 70 so as to form the barrier 62 between the first phase 64 and the second phase 66. The reaction components 68 are alternated with the separator components 70. Each reaction component 68 contacts both the first phase 64 and the second phase 66 and each separator component 70 contacts both the first phase 64 and the second phase 66. The barrier 62 is formed such that the first phase 64 can be maintained at a different chemical composition than the second phase 66. For instance, the barrier 62 can be impermeable or substantially impermeable to nonionic atoms and/or nonionic compounds.

The reaction components 68 include anodes 72 and cathodes 74. As illustrated by the arrow labeled LA and Lc, light is incident on the anodes 72 and/or cathodes 74 during operation of the solar fuels generator. The anodes 72 and cathodes 74 convert the received light into excited electron-hole pairs that drive a chemical reaction such as electrolysis of water. The anodes 72 include an anode light absorber 76 selected to absorb light at a wavelength to which the anodes 72 will be exposed during operation of the solar fuels generator. Additionally, the cathodes 74 include a cathode light absorber 78 selected to absorb light at a wavelength to which the cathodes will be exposed during operation of the solar fuels generator.

Suitable materials for the anode light absorbers 76 and the cathode light absorbers 78 include, but are not limited to, semiconductors. In some instances, the anode light absorbers 76 include or consist of a semiconductor and/or the cathode light absorbers 78 include or consist of a semiconductor. The bandgap of the semiconductors included in the anode light absorbers 76 can be larger than the bandgap of the semiconductors included in the cathode light absorbers 78. Suitable semiconductors for the anode light absorbers 76 include, but are not limited to, metal oxides, oxynitrides, sulfides, and phosphides that are stable in an oxidizing environment such as $WO_3$, $TiO_2$, and TaON. Suitable semiconductors for the cathode light absorbers 78 include, but are not limited to, p-type silicon, InP, $Cu_2O$, GaP, and $WSe_2$.

In some instances, the anode light absorbers 76 and/or the cathode light absorbers 78 are doped. The doping can be done to form one or more pn junctions within the anode light absorbers 76 and the cathode light absorbers 78. For instance, the anode light absorber 76 can be an n-type semiconductor while the cathode light absorber 78 can be a p-type semiconductor. A pn junction can also be present within either the cathode light absorbers 78 or the anode light absorber 76 or both, and is arranged so that electrons flow from the cathode light absorber 78 to a reduction catalyst (discussed below) and holes flow from the anode light absorber 76 to an oxidation catalyst (discussed below).

The dashed lines at the interface of the anode light absorber 76 and the cathode light absorber 78 illustrate an interface between the materials of the anode light absorber 76 and the cathode light absorber 78. However, the anode light absorber 76 and the cathode light absorber 78 can be the same material and/or include the same dopant. As a result, an anode light absorber 76 and the interfaced cathode light absorber 78 can be a continuous block of material. In these instances, the dashed lines shown in FIG. 3A may represent a feature that is not discernable in the solar fuels generator. One example of a material that can serve as both the anode light absorber 76 and the cathode light absorber 78 is p-type silicon, which can function as the absorber on both the anode and cathode. In particular, p-type silicon is a candidate for the cathode material because it is cathodically stable under illumination in acidic aqueous media and in conjunction with various metal catalysts can evolve $H_2(g)$ from $H_2O$.

Other possible choices for the light anode light absorber 76 and/or the cathode light absorber 78 include semiconductors having wider bandgaps than silicon that are stable in a water vapor medium such as oxide semiconductors. Some of the oxide semiconductors that can be used as a light absorber include, but are not limited to: tandem structure anodes, including tungsten oxide ($WO_3$), bismuth vanadium oxide ($BiVO_4$), tantalumoxynitride (TaON), and titanium oxide ($TiO_2$); tandem structure cathodes, including silicon (Si), cuprous oxide (Cu2O), gallium phosphide (GaP), gallium arsenide (GaAs), and indium phosphide (InP); single material electrodes, including strontium titanate ($SrTiO_3$), strontium niobate ($SrNbO_3$), and titanium oxide ($TiO_2$);

multifunction photovoltaics, including triple junction amorphous silicon (a-Si), and vertically stacked epitaxially grown III-V semiconductors with tunnel junctions; and series connected photovoltaics, including silicon (Si) cells, gallium arsenide (GaAs) cells, cadmium telluride (CdTe) cells, and Copper Indium Gallium Selenide (CIGS) thin film cells.

The absorption of light by the cathode light absorber 78 and the anode light absorber 76 generates the photovoltage that drive a reaction such as water electrolysis. When semiconductors are used for the cathode light absorber 78 and the anode light absorber 76, the achievable voltage depends on the choice of semiconductor materials, the associated bandgaps, and doping arrangements as is known in the solar cell arts. Accordingly, the material selections and arrangements can be selected to provide the desired voltage levels. For instance, tandem and multijunction structures in which two or more semiconductors in series add their voltages together can be used in order to achieve elevated voltages.

The anodes 72 include one or more oxidation catalyst layers 86 that each include or consist of one or more oxidation catalysts. One or more oxidation catalyst layers 86 can be in direct physical contact with the anode light absorber 76. As is evident from FIG. 3A, when light is to be incident on the anode, the light passes through one or more oxidation catalyst layers 86 before reaching the anode light absorber 76. As a result, the one or more oxidation catalyst layers 86 can be transparent and/or thin enough that the one or more oxidation catalyst layers 86 do not absorb an undesirably high level of the incoming light. A suitable thickness for an oxidation catalyst layer 86 includes, but is not limited to, a thickness less than 10 nm to a few micrometers.

The oxidation catalyst layer 86 and/or the oxidation catalyst can include, consist of, or consist essentially of the catalysts described above or the catalytic layer described above. For instance, the catalytic layer 6 described in the context of FIG. 2 can serve as the oxidation catalyst layer 86 and/or the metal oxides described above can serve as the oxidation catalyst. As an example, the oxidation catalyst can include, consist of, or consist essentially of a metal oxide that includes or consists of oxygen, cerium, and one or more second metals. In one example, the oxidation catalyst includes a metal oxide represented by $(La_vNi_wCo_yCe_z)O_x$ where $v+w+y+z=1$, v is greater than or equal to 0 and less than 1, w is greater than or equal to 0 and less than 1, y is greater than or equal to 0 and less than 1, and z is greater than or equal to 0 or greater than or equal to 0.1 and/or less than 1 or less than or equal to 0.8, x is greater than 0 or greater than or equal to 0.5 and/or less than or equal to 3, 2, or 1.6, and at least one, two, three or four of v, w, y, and z is greater than 0. As an example, $(La_{0.1}Ni_{0.1}Co_{0.3}Ce_{0.5})O_x$ is suitable for use as the oxidation catalyst because it is transparent or substantially transparent and exhibits a high level of catalytic activity at low overpotentials.

The cathodes 74 include one or more reduction catalyst layers 88 that each includes or consists of one or more reduction catalysts. One or more reduction catalyst layers 88 can be in direct physical contact with the cathode light absorber 78 as is shown in FIG. 3A. As is evident from FIG. 3A, when light is to be incident on the cathode, the light passes through one or more reduction catalyst layers 88 before reaching the cathode light absorber 78. As a result, the one or more reduction catalyst layers 88 can be transparent and/or thin enough that the one or more reduction catalyst layers 88 do not absorb an undesirably high level of the incoming light. A suitable thickness for a reduction catalyst layer 88 includes, but is not limited to, a thickness of about 1 nm to 10 μm. In some instances, the catalyst layer 88 does not need to be transparent. For instance, the catalyst layer 88 need not be transparent if it is facing down (i.e., is away from the incident light source).

Suitable reduction catalysts include, but are not limited to, Pt, NiMo, and NiCo. The one or more reduction catalyst layers 88 are positioned on a surface of the cathode light absorber 78 such that a line that is perpendicular to the surface extends from the surface through one or more of the reduction catalyst layers 88 before extending through the second phase 66. The one or more reduction catalyst layers can be positioned such that the one or more reduction catalyst layers are on more than 10%, 30%, 50%, 75%, or 90% of the surface of the cathode light absorber 78.

The separator components 70 include or consist of a separator 90 located between the first phase 64 and the second phase 66. The separator 90 is ionically conductive. In some instances, the separator 90 is cationically conductive while concurrently being sufficiently nonconductive to the other components of the first phase 64 and the second phase 66 that the first phase 64 and the second phase 66 remain separated from one another. For instance, in some instances, the separator 90 is cationically conductive and non-conductive or substantially non-conductive to nonionic atoms and/or nonionic compounds. In some instances, the separator 90 is cationically conductive while being non-conductive or substantially non-conductive to nonionic atoms and/or non-ionic compounds and also to anions. Accordingly, the separator 90 can provide a pathway along which cations can travel from the first phase 64 to the second phase 66 without providing a pathway or a substantial pathway from the first phase 64 to the second phase 66 to one, two, or three entities selected from a group consisting of anions, nonionic atoms or nonionic compounds. In some instances, it may be desirable for the separator 90 to conduct both anions and cations. For instance, when the first phase 64 and/or the second phase 66 has elevated pH levels a separator 90 that conducts both anions and cations may be used. As a result, in some instances, the separator 90 conducts cations and anions but not nonionic atoms or nonionic compounds.

Additionally, the separator 90 should be able to exchange ions sufficiently to prevent the buildup of a pH gradient, and separate the reaction products sufficiently to prevent them from re-combining. A suitable separator 90 can be a single layer or material or multiple layers of material. Suitable materials for the separator 90 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. A suitable material having a structure according to Formula I is sold under the trademark NAFION®. NAFION® is an example of a material that is cationically conductive of cations but is not conductive of anions or nonionic atoms or nonionic compounds. Another suitable separator 90 includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

During operation, the solar fuels generator is exposed to light such as sunlight, terrestrial solar illumination, AM1 solar radiation, or similar illumination having approximately 1 kilowatt per square meter of incident energy or less. These light sources can be unconcentrated or can be concentrated using known light concentration devices and techniques. In some instances, the solar fuels generator is oriented such that the light travels through the anodes before reaching the cathodes. When the anode light absorber 76 has a larger bandgap than the cathode light absorber 78, the anodes absorb higher energy (shorter wavelength) light and allow lower energy (longer wavelength) light to pass through to the cathodes. The cathodes can then absorb the longer wavelengths. Alternately, the light can be incident on both the anodes and the cathodes or can be incident on the cathodes before reaching the anodes.

The absorption of light by an anode light absorber 76 generates hole-electron pairs within the anode light absorber 76. The presence of an n-type anode light absorber 76 in the first phase 64 produces an electrical field that causes the holes to move to the surface of the anode light absorber 76 and then the surface of the oxidation catalyst layer 86 where the oxidation of water occurs as illustrated by the first reaction in FIG. 3A. The electrons generated in the anode light absorber 76 move toward the cathode light absorber 78 as a result of the electrical field.

The protons generated in the first reaction move from the oxidation catalyst layer 86 into the first phase 64. Since the separator 90 is cationically conductive, the protons move from the first phase 64 to the second phase 66 through the separator 90. As a result, the pathlength for the protons is reduced to the thickness of the separator 90. A suitable thickness for the separator 90 is a thickness of about 100 nm to 1 µm or more.

The absorption of light by the cathode light absorber 78 generates hole-electron pairs within the cathode light absorber 78. The presence of a p-type cathode light absorber 78 in the second phase 66 produces an electrical field that causes the electrons within the cathode light absorber 78 to move to the surface of the cathode light absorber 78 and then the surface of the reduction catalyst layers 88 where they react with the protons to form hydrogen gas as illustrated by the second reaction in FIG. 3A. The generated fuel can enter the second phase 66 and can be stored for later use. The holes generated in the cathode light absorber 78 by the absorption of light move from the cathode light absorber 78 toward the anode light absorber 76 as a result of the electrical field and can recombine with the electrons from the anode light absorber 76.

The first phase 64 is generally different from the second phase 66. For instance, the first phase 64 generally has a different chemical composition than the second phase 66. The first phase 64 and the second phase can both be a liquid. For instance, the first phase 64 can be a standing, ionically conductive liquid such as water.

The one or more oxidation catalyst layers 86 illustrated in FIG. 3A can include materials in addition to the oxidation catalyst. For instance, an oxidation catalyst layer 86 can include one or more components selected from a group consisting of electrically conductive fillers, electrically conductive materials, diluents, and/or binders. The one or more reduction catalyst layers 88 illustrated in FIG. 3A can include materials in addition to the one or more reduction catalysts. For instance, a reduction catalyst layer 88 can include one or more components selected from a group consisting of electrically conductive fillers, electrically conductive materials, diluents, and/or binders.

A suitable method for forming oxidation catalyst layers 86 on the anode light absorber 76 includes, but is not limited to, electrodeposition, sputtering, electroless deposition, spray pyrolysis, and atomic layer deposition. Alternately, the catalyst layer 86 can be a catalytic layer formed directly on the anode light absorber 76 as described below. A suitable method for forming reduction catalyst layers 88 on the cathode light absorber 78 includes, but is not limited to, electrodeposition, sputtering, electroless deposition, spray pyrolysis, and atomic layer deposition. A suitable method for attaching the separator 90 to the anodes 72 and/or cathodes 74 includes, but is not limited to, clamping, lamination, sealing with epoxy or glue and the like.

The catalysts, catalytic layers 6, and catalyst layers 86 disclosed above can be generated using a solution in which metal precursors having the desired metals are dissolved. Suitable solvents for the solution include, but are not limited to, water, alcohols and organic solvents. The metal precursors act as the source of the metals in the solution and eventually in the metal oxide. Suitable metal precursors include, but are not limited to, alkoxides, and/or metal salts such as nitrates and chlorides, or other soluble metal compounds. Example metal precursors include $Ni(NO_3)_2$, $Fe(NO_3)_3$, $CO(NO_3)_2$, and $Ce(NO_3)_3$. In some instances, a surfactant can be added to the solution to modify one or more properties of the solution such as the viscosity, wetting properties. Examples of suitable surfactants include, but are not limited to, nonionic polyols from the Pluronic or Brij family. In some instances, the solution includes a coordinating organic agent such as acetic acid and a strong acid such as nitric acid or hydrochloric acid as a sol-gel condensation initiator. The solution can be applied to a support using techniques including, but not limited to, inkjet printing, spin coating, and drop casting. In some instances, a portion of an electrode serves as the support. For instance, an electrode base 8 discussed in the context of FIG. 2 can serves as the support and/or an anode light absorber 76 can serves as the support. Accordingly, the oxidation catalyst layer 86 can be formed directly on the anode light absorber 76 and/or the catalytic layer can be formed directly on the electrode base 8. The solution mixtures can be dried on the surface of the support and the metal precursors converted to oxides by heating at a moderate temperature to gel the surfactant and enhance inorganic sol gel reactions, at a higher temperature to evaporate the solvent and then at a still higher temperature to decompose the inorganic precursors, oxidize the organic components and produce a metal oxide material. The oxygen in the resulting film originates from the metal precursor and/or from the atmosphere the precursor film is heated in. The resultant metal oxide film contains the equilibrium oxygen concentration determined by the calcination temperature and atmosphere. The oxygen concentration may be changed by electrochemical or chemical pretreatments or under operating conditions to form the active catalyst. As an illustrative, but not exclusive, example, after deposition on the substrates precursor films can be calcinated in air at 40° C. for 18 h, then at 70° C. for 24 h, followed by a 5 h ramp and 10 h soak at 350° C. Active catalysts can also be synthesized with numerous variations in the temperature treatment. This treatment produces Ce containing catalysts in which the metals are intimately mixed.

EXAMPLES

Example 1

Catalysts were prepared using the following metal precursors: $Ni(NO_3)_2\text{-}6H_2O$ (1.53 g, 99.99%, Sigma Aldrich), and $Fe(NO_3)_3\text{-}9H_2O$ (2.14 g, 98%, Sigma Aldrich), Co(NO$_3$)$_2$-6H$_2$O (1.46 g. 99.99% Sigma Aldrich), and Ce(NO$_3$)$_3$-6H$_2$O (2.22 g, 99.99%, Sigma Aldrich). The metal precursors were mixed in the molar ratio that was desired in the catalyst with a total of 5 mmole of the metals in the resulting mixture was mixed with 0.80 g Pluronic F127 (Aldrich), 1.0 mL glacial acetic acid (T.J. Baker, Inc.), 0.40 mL of concentrated HNO$_3$, and 30 mL of 200 proof ethanol (Koptec). The solution mixtures were deposited on a fluorine-doped tin oxide (FTO)-coated glass plate, glassy carbon, graphite, or other electrically conducting substrate to create supported catalysts. The supported solution mixtures were dried and the metal precursors converted to oxides by sequential calcinations in air at 40° C. for 18 h, then at 70° C. for 24 h, followed by a 5 h ramp and 10 h soak at 350° C. Powders of the catalyst were prepared by first combining the precursor inks prepared above. The combined ink was a stable, clear solution, which was poured into a 100 mm diameter petri dish to form a thick liquid film. The bulk ink solution was dried and converted to the oxide identically to the supported catalyst precursors described above by heating in air at 40° C. for 18 h, then at 70° C. for 24 h, followed by a 5 h ramp and 10 h soak at 350° C. or vigher temperatures. The resultant course powder was further reduced in particle size by mechanical grinding. The result was catalysts that included cerium, were x-ray amorphous and intimately mixed metals.

Example 2

The performance of a catalyst ((Fe$_{0.03}$Ni$_{0.3}$Co$_{0.2}$Ce$_{0.43}$)O$_x$) generated according to example 1 was tested by using the catalysts in a water electrolysis device. The testing was performed using a custom-built alkali electorlyzer connected to a commercial photovoltaic device exposed to AM1.5 illumination. The anode included the (Fe$_{0.03}$Ni$_{0.3}$Co$_{0.2}$Ce$_{0.43}$)O$_x$ catalyst and the cathode included a NiMo hydrogen evolution reaction catalyst. Stable water electrolysis was attained with an average current density of over 4 mA/cm$^2$ for over 100 hours with a total cell voltage of 1.87 V.

Example 3

The performance of a catalyst ((La$_{0.1}$Ni$_{0.1}$Co$_{0.3}$Ce$_{0.5}$)O$_x$ was generated according to example 1 but using metal nitrates and metal chlorides as the metal precursor source of the La, Ni, Co, and Ce. The catalyst was tested by using the catalysts in a water electrolysis device. The testing was performed using a custom-built alkali electrolyzer connected to a commercial potentiostat. The anode included the ((La$_{0.1}$Ni$_{0.1}$Co$_{0.3}$Ce$_{0.5}$)O$_x$ catalyst and the cathode included either a Pt or Ni—Mo alloy hydrogen evolution reaction catalyst. Stable water electrolysis was attained with an average current density of 4.5 mA/cm$^2$ for 100 hours.

Example 4

The catalytic current provided as a function of overpotential was measured for several catalysts using a custom built scanning drop electrochemical cell to collect three sequential chronopotentiometry (CP) measurements at 10, 1, and 19 mA/cm$^2$ current density at each composition sample. The measurements were used to identify the Tafel slope of the catalysts. The catalyst ((Fe$_{0.03}$Ni$_{0.3}$CO$_{0.2}$Ce$_{0.43}$)O$_x$) catalysts was generated according to example 1 and provided a Tafel slope of about 80 mV/decade. The catalyst (Ni$_{0.27}$Co$_{0.2}$Ce$_{0.43}$)O$_x$ was generated according to example 1 and provided a Tafel slope of about 90 mV/decade. The catalyst (Ni$_{0.5}$Fe$_{0.5}$)O$_x$ provided a Tafel slope of about 50 mV/decade.

Example 5

A variety of metal oxide catalysts that each included different molar ratios of Mn, Co, Ta and Sb were generated using the method of Example 1 but with the following metal precursors: Mn(NO$_3$)$_2$, Co(NO$_3$)$_2$, TaCl$_5$, and SbCl$_3$. Stability tests were performed in a pH=0 solution of 1 M sulfuric acid for two hours at an applied potential of 1.7 V versus Reversible Hydrogen Electrode (RHE). Afterwards, the overpotential required for the Oxygen Evolution Reaction was measured at 3 mA/cm$^2$. The catalysts with up to 15% Ta and up to 25% Sb and different ratios of Mn: Co showed overpotentials less than 600 mV. An elevated level of catalytic activity appears near the catalyst with metal ratios near (Mn$_{0.3}$Co$_{0.4}$Sb$_{0.3}$)O$_x$, where the overpotential after 2 hours of polarization was measured to b e 570 mV at 3 mA/cm$^2$. Without being exposed to the stability testing, the catalyst (Mn$_{0.3}$Co$_{0.4}$Sb$_{0.3}$)O$_x$ measured an overpotential of 530 mV after 15 s at 3 mA/cm$^2$. Comparing the 15 s and 2 hour measurements of overpotential, the average increase in overpotential is less than 0.5 mV per minute. Accordingly, these catalysts provide catalytic activity and tolerance to highly acidic conditions.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An Oxygen Evolution Reaction (OER) catalyst, comprising:
    a metal oxide that includes oxygen, cerium, and one or more second metals, the cerium being between 10 and 80 molar % of the metals in the metal oxide and wherein the metal oxide provides an Oxygen Evolution Reaction (OER) Tafel slope greater than 50 mV/decade.

2. The OER catalyst of claim 1, wherein the one or more second metals are selected from the group consisting of transition metals, post transition metals and lanthanides.

3. The OER catalyst of claim 1, wherein the one or more second metals are transition metals.

4. The OER catalyst of claim 1, wherein the metal oxide is represented by (M$_{1v}$M$_{2w}$M$_{3y}$Ce$_z$)O$_x$ where M$_1$ represents a first metal, M$_2$ represents a second metal, M$_3$ represents a third metal, v+w+y+z=1, v is greater than or equal to 0 and less than 1, w is greater than or equal to 0 and less than 1, y is greater than 0 and less than 1, and z is greater than 0, and x is greater than 0.

5. The OER catalyst of claim 4, wherein z is greater than or equal to 0.1 and less than or equal to 0.8.

6. The OER catalyst of claim 4, wherein z is greater than or equal to 0.3 and less than or equal to 0.6.

7. The OER catalyst of claim 4, wherein M$_3$ is selected from the group consisting of cobalt, nickel and iron,
    M$_1$ and M$_2$ are different,
    M$_1$ and M$_2$ are selected from the group consisting of transition metals, post transition metals and lanthanides, and
    v is greater than 0 and w is greater than 0.

8. The OER catalyst of claim 7, wherein $M_1$ and $M_2$ are different from $M_3$,
   $M_1$ and $M_2$ are selected from the group consisting of Ni, Mn, Cu, Zn, Sn, Ta, Y, Gd, La, and Fe, and
   v is greater than 0 and w is greater than 0.

9. The OER catalyst of claim 4, wherein $M_1$, $M_2$, and $M_3$ are different,
   $M_2$ and $M_3$ are each selected from the group consisting of cobalt, nickel and iron,
   $M_1$ is selected from the group consisting of transition metals, post transition metals and lanthanides, and
   v is greater than 0 and w is greater than 0.

10. The OER catalyst of claim 4, wherein $M_1$, $M_2$, and $M_3$ are different,
    $M_2$ and $M_3$ are each selected from the group consisting of cobalt, nickel and iron,
    $M_1$ is selected from the group consisting of Ni, Mn, Cu, Zn, Sn, Ta, Y, Gd, La, and Fe, and
    v is greater than 0 and w is greater than 0.

11. The OER catalyst of claim 10, wherein $M_1$ represent La.

12. The OER catalyst of claim 10, wherein the metal oxide is represented by $(Fe_v Ni_w Co_y Ce_z)O_x$ and v is greater than 0 and w is greater than 0.

13. The OER catalyst of claim 1, wherein the metal oxide has an opacity less than 50% per 100 nm thickness when averaged over the visible spectrum.

14. The OER catalyst of claim 1, wherein the metal oxide is included in an electrode.

15. The OER catalyst of claim 14, wherein the electrode is included in an oxygen evolution system where the Oxygen Evolution Reaction (OER) occurs at the electrode.

16. The OER catalyst of claim 15, wherein the metal oxide is included in an electrode at which the Oxygen Evolution Reaction occurs.

17. The OER catalyst of claim 16, wherein the electrode is included in an Oxygen Evolution Reaction (OER) system where the electrode is exposed to an environment with a pH less than 3.

18. An Oxygen Evolution Reaction (OER) catalyst, comprising:
    a metal oxide that includes three or more metals selected from the group consisting of Mn, Co, Ta, Sn, and Sb and wherein the metal oxide provides an Oxygen Evolution Reaction (OER) Tafel slope greater than 50 mV/decade.

19. The OER catalyst of claim 18, wherein the metal oxide includes oxygen, Mn, Co, Ta, and Sb.

* * * * *